(12) United States Patent  
Reece et al.

(10) Patent No.: US 8,879,693 B2
(45) Date of Patent: *Nov. 4, 2014

(54) SYSTEM AND METHOD FOR VOICE-ACTIVATED DIALING OVER IMPLICIT AND EXPLICIT NFA TRUNKS

(75) Inventors: David W. Reece, Harrisonville, MO (US); Roger T. Trueman, Olathe, KS (US); John Zeigler, Lee's Summit, MO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 658 days.

This patent is subject to a terminal disclaimer.

(21) Appl. No.: 13/227,194

(22) Filed: Sep. 7, 2011

(65) Prior Publication Data

US 2011/0317690 A1 Dec. 29, 2011

Related U.S. Application Data

(63) Continuation of application No. 11/714,359, filed on Mar. 6, 2007, now Pat. No. 8,041,012.

(51) Int. Cl.
*H04M 1/64* (2006.01)
*G10L 15/26* (2006.01)
*H04M 3/42* (2006.01)
*H04M 7/00* (2006.01)

(52) U.S. Cl.
CPC ........ *H04M 3/42204* (2013.01); *H04M 7/0057* (2013.01); *G10L 15/265* (2013.01)
USPC ................ 379/88.01; 379/88.13; 379/212.01; 370/352

(58) Field of Classification Search
USPC .................... 379/12, 22, 32.02, 88.01–88.04, 379/112.08, 137, 154, 187, 197, 212.01, 379/230–232, 234–236, 240, 246, 278, 333, 379/337, 88.13; 370/352
See application file for complete search history.

(56) References Cited

U.S. PATENT DOCUMENTS

| 8,041,012 | B2 | 10/2011 | Reece et al. |
| 2002/0118802 | A1 | 8/2002 | Krofchalk |
| 2003/0228012 | A1 | 12/2003 | Williams et al. |
| 2007/0110043 | A1 | 5/2007 | Girard |
| 2008/0219428 | A1 | 9/2008 | Reece et al. |

OTHER PUBLICATIONS

U.S. Appl. No. 11/714,359; Issue Notification dated Sep. 28, 2011; 1 page.
U.S. Appl. No. 11/714,359; Notice of Allowance dated Jun. 23, 2011; 11 pages.

*Primary Examiner* — Md S Elahee
(74) *Attorney, Agent, or Firm* — Swanson & Bratschun, L.L.C.

(57) ABSTRACT

A system and method for voice-activated dialing using implicit and explicit trunks including receiving a call from the user telephone and establishing a first connection. In response to establishing the first connection, a second connection may be established over the implicit trunk. In response to establishing the second connection, a third connection may be initiated. In response to the user telephone sending a keyword, the implicit trunk may be disconnected and the call may be connected via the explicit trunk. If a spoken number is received, then the spoken number may be translated into a computer readable telephone number. Alternatively, if a dialed telephone number is received from the user telephone, the telephone number may be used to route the call. In response to receiving the telephone number, the explicit trunk may be disconnected and the call from the user telephone may be routed to the received telephone number.

18 Claims, 2 Drawing Sheets

SYSTEM AND METHOD FOR VOICE-ACTIVATED DIALING OVER IMPLICIT AND EXPLICIT NFA TRUNKS

RELATED APPLICATIONS

This application is a continuation of U.S. patent application Ser. No. 11/714,359, filed on Mar. 6, 2007, now U.S. Pat. No. 8,041,012 the entire contents of which are hereby incorporated by reference in their entirety.

FIELD OF THE INVENTION

The field of the invention is directed to voice-activated dialing application in a telecommunications environment, and more particularly, to a system and method for voice-activated dialing over implicit and explicit NFA trunks.

BACKGROUND OF THE INVENTION

Voice Dialing Platforms ("VDP") are used to provide voice activated dialing features to users that possess telephone systems that can be routed over the Internet or IP-based network, such as voice over Internet protocol ("VoIP") telephone systems. In a typical VoIP network, telephones may be connected to a PBX/Voice Router that is connected to a hub/router/asynchronous digital subscriber line ("ADSL") modem. The ADSL modem is connected to the Internet that transmits the digitized voice signals anywhere in the world where similar equipment exists on the far end of the call.

VoIP can enable tasks or offer services that may be more difficult to achieve through the traditional Plain Old Telephone System ("POTS"). Nevertheless, users who do not possess VoIP phones have been unable to access VDP without going over pure VoIP environments.

SUMMARY

In one embodiment, the present System and Method for Voice-Activated Dialing over Implicit and Explicit NFA Trunks ("Voice-Activated Dialing System") greatly simplifies the requirements for both the gateway server and the feature server, while maintaining the core dialing plan within a conventional voice switch at a central office. The present Voice-Activated Dialing System provides direct connection between a NFA trunk and a VDP on an application server.

A system and method for voice-activated dialing using implicit and explicit trunks including receiving a call from the user telephone and establishing a first connection. In response to establishing the first connection, a second connection may be established over the implicit trunk. In response to establishing the second connection, a third connection may be initiated. In response to the user telephone sending a keyword, the implicit trunk may be disconnected and the call may be connected via the explicit trunk. If a spoken number is received, then the spoken number may be translated into a computer readable telephone number. Alternatively, if a dialed telephone number is received from the user telephone, the telephone number may be used to route the call. In response to receiving the telephone number, the explicit trunk may be disconnected and the call from the user telephone may be routed to the received telephone number.

Another embodiment of a system and method for voice-activated dialing using implicit and explicit trunks may include receiving a call from the user telephone and establishing a first connection. An implicit trunk and an explicit trunk may be established. In response to the user telephone sending a keyword, the implicit trunk may be disconnected and the call may be connected via the explicit trunk. In response to receiving a spoken number, the spoken number may be translated into a computer readable telephone number. In response to receiving the telephone number, the explicit trunk may be disconnected, and the call may be routed from the user telephone to the received telephone number.

DETAILED DESCRIPTION OF THE DRAWINGS

Figure 1:
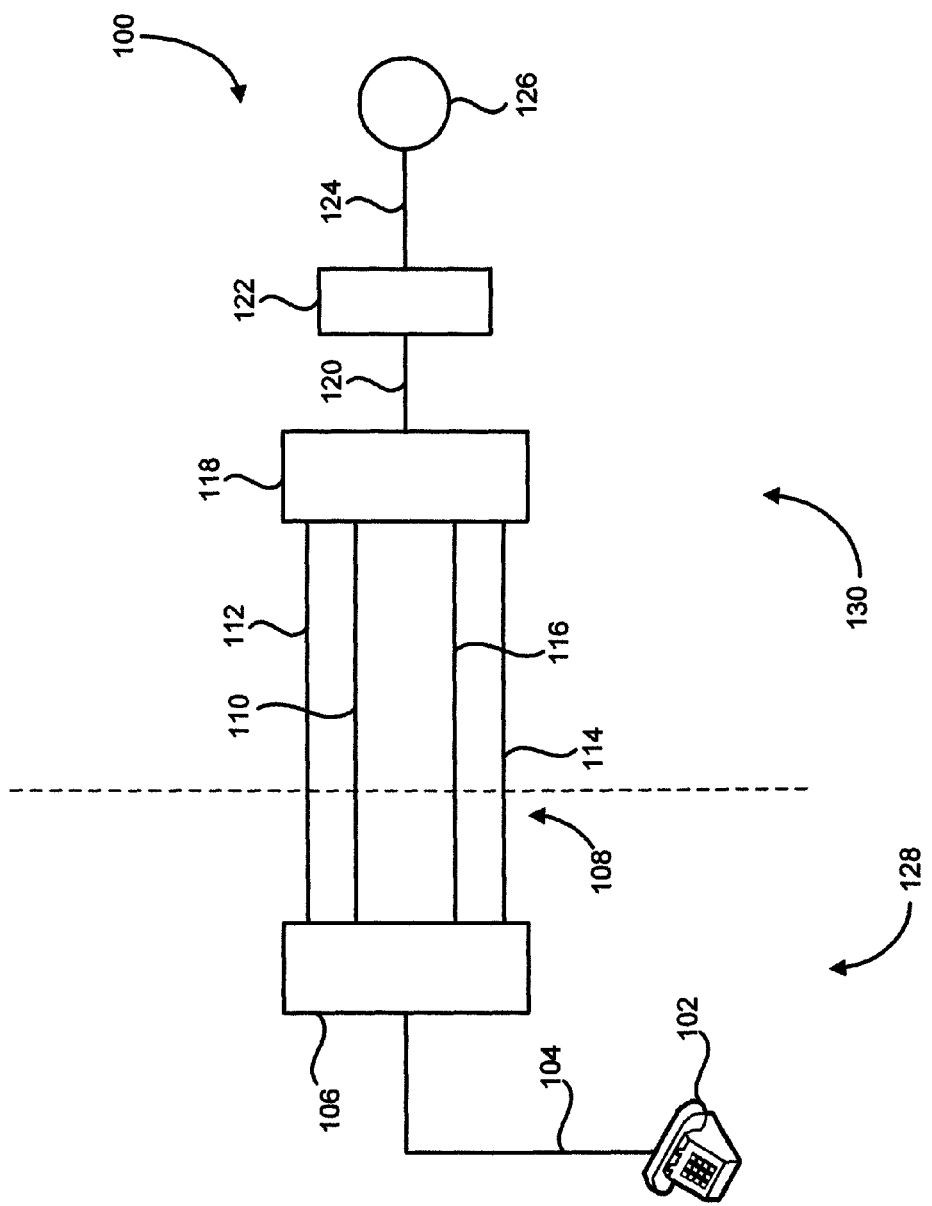
FIG. 1 illustrates a network diagram including implicit and explicit NFA trunks interconnected with a DVP on an application server according to an embodiment of the present invention.

In the drawings, like or similar elements are designated with identical reference numerals throughout the several views and figures thereof, and various depicted elements may not be drawn necessarily to scale. FIG. 1 illustrates an embodiment 100 of a network for the Voice-Activated Dialing System that includes a user's phone 102 that is connected to a telephone company's central office ("central office") 106 through a subscriber line 104. The central office 106 is connected to a voice gateway 118 through four DS1 (also known as T1) lines 108. The DS1 lines 108 include two explicit trunks 110 and 112 and two implicit trunks 114 and 116. The voice gateway 118 is connected to a session initiation protocol ("SIP") feature server 122 via Ethernet connection 120. The SIP feature server 122 is connected to a network address book database 126 via Ethernet connection 124. The user's phone 102, subscriber line 104, and central office 106, and DS1 lines 108 typically comprise the telephone exchange 128. The DS1 lines 108, voice gateway 118, Ethernet connection 120, SIP feature server 122, Ethernet connection 124, and network address book database 126 typically comprise the network data center 130 or the VoIP environment.

In one embodiment, the SIP feature server 122 may be programmed on the network by users. For example, when a user goes out to the Internet and sets up their address book, they may access the network address book server and database and they may type in "John Doe, 123-4567." So, when the SIP feature server 122 hears the user say "John Doe," it searches its register for the name John Doe and its associated telephone number.

The subscriber line 104 is typically an analog, digital, or BRI connection to the user's phone 102. User's phone 102 may include telephones, telephone instruments, or telephone systems. The central office 106 is typically a building that houses the switching gear, equipment, and computers used to connect telephone calls between one or more user's phone 102. The central office 106 further may include the subscriber lines 104 are joined to the switching equipment in the central office 106 for connecting to other user's phones 102.

The DS1 lines 108 preferably are network facility access or time division multiplex trunks. The trunks are communication lines between the central office 106 and voice gateway 118. Typically, the DS1 lines 108 use a technique for transmitting separate data, voice, and/or video signals simultaneously over the DS1 lines 108 by interleaving a piece of each signal one after another. The network data center 130 may include one or more of the voice gateways 118. In one aspect, these voice gateways 118 are time division multiplex ("TDM") trunks that are connected to the voice switches at the central office 106. In one aspect, the voice gateway 118 is a trunk gateway that has the ability to handle wink-start DT trunk types. A wink start means a short duration off hook signal. The SIP feature server 122 is preferably a feature server that operates a voice-activated application.

Figure 2:
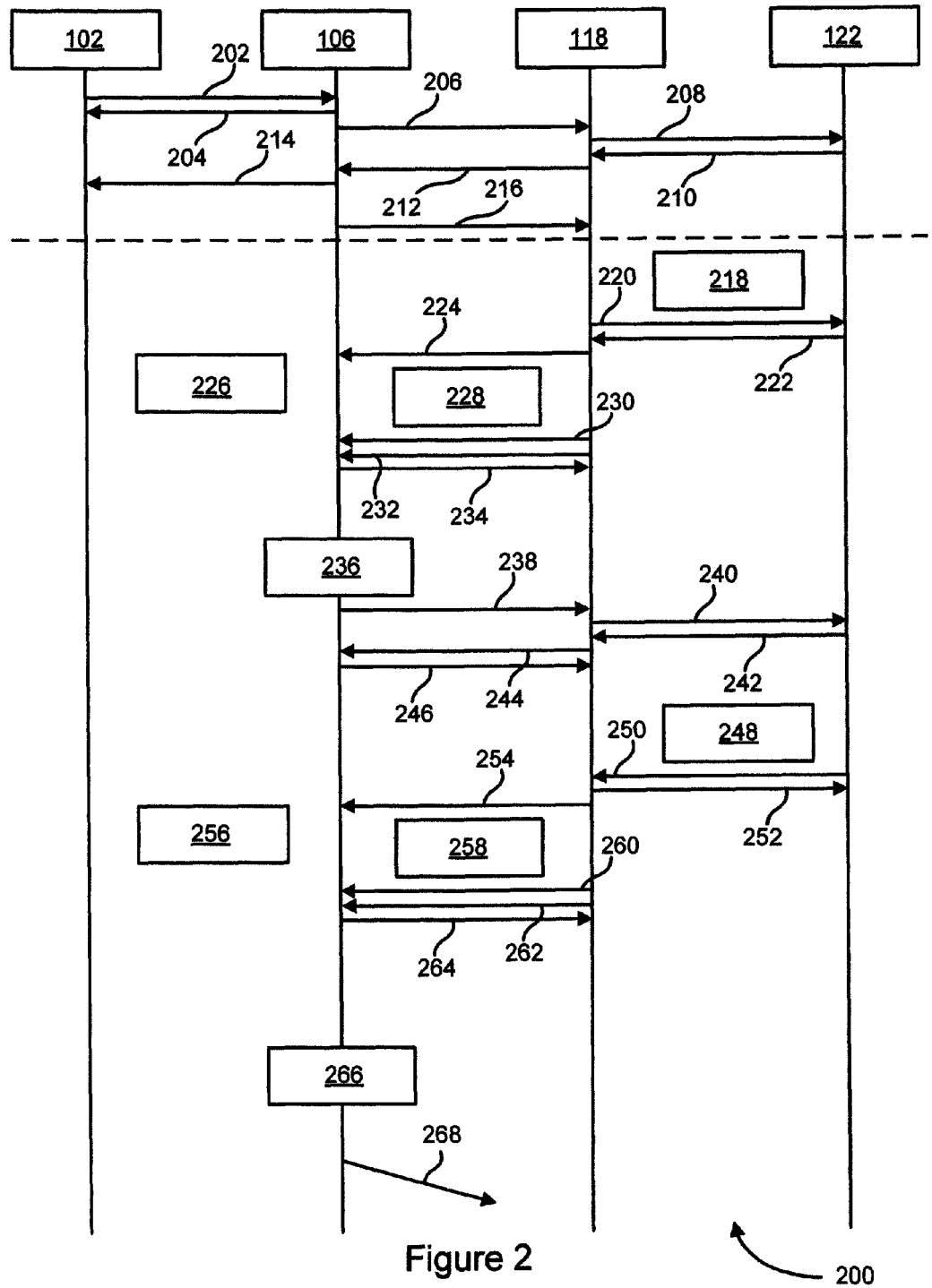
FIG. 2 illustrates a flow diagram for the method for voice-activated dialing over implicit and explicit NFA trunks according to an embodiment of the present invention.

The present Voice-Activated Dialing System further includes a method for connecting a user's phone 102 and subscriber line 104 to a VDP on an application server. FIG. 2 illustrates an embodiment 200 of a method for connecting a user's phone 102 to a voice-activated dialing platform or SIP feature server 122 on an application server. In step 202, the user's phone 102 goes off hook via a DSO wink start digit tone trunk group type. In this method, a subscriber may interact with the VDP, SIP feature server 122, or may revert to regular call processing by dialing as normal. In step 204, a dial tone is sent to the user's phone 102 from the central office 106. In step 206, the central office 106 seizes implicit trunks 114 and 116 between the central office 106 and the voice gateway 118. In step 208, the voice gateway 118 then makes an invite connection through the VoIP gateway via the Ethernet connection 120 to the SIP feature server 122. In step 210, the SIP feature server 122 "OKs" the connection between the SIP feature server 122 and the voice gateway 118. In step 212, the voice gateway 118 answers supervision to the central office 106 and in step 214, the central office 106 removes the dial tone from the user's phone 102. In step 216, the central office 106 performs a cut-through switch to voice gateway 118.

In step 218, the SIP feature server 122 waits to receive a spoken or voiced keyword, such as "voice dialing" or "address book," from the user on the user's phone 102. If the SIP feature server 122 receives a spoken keyword instead of a dialed number, then in step 220 the Voice-Activated Dialing System 100 refers or redirects the call to the explicit trunks 110 and 112 back at the central office 106. Thus, the call is redirected from the implicit trunks 114 and 116 to the different explicit trunks 110 and 112 between the central office 106 and the voice gateway 118.

In one embodiment, this redirection from implicit trunks to explicit trunks is performed in the following manner. In step 222, the voice gateway 118 provides an "acceptance" to the SIP feature server 122. In step 224, the voice gateway 118 performs an inverted wink to the central office 106. In step 226, the user's phone 102 is put on hold, and in step 228, a universal tone receiver is attached between the central office 106 and the voice gateway 118. In step 230, the voice gateway 118 hands off the call to the central office 106 if any dialed digits are detected by the voice gateway 118. Thus, if during this voice-activation process the user starts dialing digits, the voice gateway 118 will hand the call back to the central office 106.

In this step, the voice gateway 118 listens waits for an interdigital timeout or a dialed number from the user's phone 102. In this step, if the user has not completed the call within a predetermined period of time, the Voice-Activated Dialing System 100 will user will receive a reorder and the call will go into a lockout state until it is re-originated. Then, in step 234, the central office 106 disconnects the implicit trunks 114 and 116 and seizes explicit trunks 110 and 112 in step 238, during which time a translation 236 is operated. The central office 106 connects to the explicit trunks 110 and 112 and brings up the connection. Now, the user is connected again to the SIP feature server SIP feature server 122, so that the SIP feature server 122 can listen for a voice-activated phone number.

Once it receives the phone number, it changes it to digits and communicates to the central office 106 the spoken phone number, as discussed further below. For example, a user speaks the phone number "1234567" and the SIP feature server 122 translates the spoken numbers into actual digits through the voice gateway 118, and then sends the translated digits to the central office 106 that routes the call.

In step 240, the voice gateway 118 then makes an invite connection through the VoIP gateway via the Ethernet connection 120 to the SIP feature server 122. In step 242, the SIP feature server 122 "OKs" the connection between the SIP feature server 122 and the voice gateway 118. In step 244, the voice gateway 118 answers supervision to the central office 106 and in step 246, the central office 106 performs a cut-through switch to voice gateway 118. In step 248, the voice gateway 118 listens for the spoken number to dial from the user.

In step 250, the SIP feature server 122 returns the translation of the spoken number in the form of a number, which is accepted in step 252 by the voice gateway 118. In step 254, an inverted wink is sent from the voice gateway 118 to the central office 106 and the user's phone 102 is placed on hold in step 256. In step 258, the universal tone receiver is attached. In step 260, the number is dialed or an interdigital timeout is received by the central office 106. In step 264, the explicit trunks 110 and 112 are disconnected and in step 266 the translation is performed. Finally, in step 268, the central office 106 routes the call to the dialed number.

In one aspect, the Voice-Activated Dialing System 100 has the ability to determine inter and intra-local access transportation area ("LATA") dialing plans based on originating and terminating NPA-NXXX along with the ability to add the inter and intra-LATA primary intra-LATA carrier ("PIC") in front of the dialing stream. In addition, the Voice-Activated Dialing System 100 maintains the "privacy bit" for private numbers. Further, it maintains and passes along calling and called number information for billing purposes.

In one embodiment, a Warm Line ("WML") is used. The WML is basically a time delayed automatic line meaning that if a user with a WML feature goes off hook and commences dialing within a time delay period, the call will proceed normally. If the dialing has not started before the end of the time delay period, the call is treated as an automatic line (hot line). The called number specified will be used as the forward number which will be routed to the gateway. The time delay is specified on a per-line basis, and its value may range from 0 to 20 seconds, with a usual value being 4 or 5 seconds. In another embodiment, the user dials an access code to initiate a voice dialing session. Control will now be via the voice gateway 118 and SIP feature server 122.

There has been described a system and method for voice-activated dialing over implicit and explicit NFA trunks. It should be understood that the particular embodiments described within this specification are for purposes of example and should not be construed to limit the invention. Further, it is evident that those skilled in the art may now make numerous uses and modifications of the specific embodiment described, without departing from the inventive concepts. For example, different types and numbers of switches may be used without departing from the inventive concepts.

What is claimed:

1. A system for voice-activated dialing using implicit and explicit trunks, said system comprising:
    a central office in communication with a user telephone;
    a voice over internet protocol (VoIP) gateway in communication with the central office via an implicit trunk and explicit trunk;

a session initiation protocol (SIP) feature server in communication with said VoIP gateway;
said central office receiving a call from the user telephone and establishing a first connection;
in response to said central office establishing the first connection, said central office initiating a second connection over the implicit trunk between said central office and VoIP gateway;
in response to said central office establishing the second connection with said VoIP gateway, said VoIP gateway initiating a third connection with said SIP feature server, said SIP feature server operating a voice-activated dialing platform;
in response to the user telephone sending a keyword to said SIP feature server, said central office disconnecting the implicit trunk and connecting the call with said SIP feature server via the explicit trunk; and
if said VoIP gateway receives a spoken number, then said SIP feature server receives and translates the spoken number into a computer readable telephone number, and further communicates the telephone number to said VoIP gateway, which, in turn, communicates the telephone number to said central office; and
in response to receiving the telephone number from said VoIP gateway, said central office disconnects the explicit trunk and routes the call from the user telephone to the received telephone number via said implicit trunk.

2. The system according to claim 1, wherein said central office establishes the first connection in response to receiving an off-hook wink start from the user telephone.

3. The system according to claim 1, wherein said VoIP gateway performs an inverted wink communication with said central office.

4. The system according to claim 1, wherein said central office is configured to put the user telephone on hold prior to disconnecting the implicit trunk and connecting the explicit trunk.

5. The system according to claim 4, wherein said central office is further configured to put the user telephone on hold prior to disconnecting the explicit trunk and routing the call to the dialed telephone number.

6. The system according to claim 1, further comprising a universal tone receiver between said central office and said VoIP gateway.

7. The system according to claim 1, wherein said VoIP gateway hands off the call to said central office if any dialed digits are detected.

8. The system according to claim 1, wherein said VoIP gateway communicates with said SIP feature server in response to receiving a spoken keyword prior to a dialed number.

9. The system according to claim 1, wherein said SIP feature server listens for a voice telephone number, and, in response to receiving a voice telephone number, communicates the voice telephone number to said VoIP gateway.

10. A method for voice-activated dialing using implicit and explicit trunks, said method comprising:
receiving a call from the user telephone and establishing a first connection, with a central office;
in response to establishing the first connection, initiating a second connection over the implicit trunk between said central office and a voice over internet protocol (VoIP) gateway;
in response to establishing the second connection, initiating a third connection with a session initiation protocol (SIP) feature server, said SIP feature server operating a voice-activated dialing platform;
in response to the user telephone sending a keyword to the SIP feature server, said central office disconnecting the implicit trunk and connecting the call with said SIP feature server via the explicit trunk; and
if a spoken number is received, then translating the spoken number into a computer readable telephone number, and further communicating the telephone number to said VoIP gateway, which, in turn, communicates the telephone number to said central office; and
in response to receiving the telephone number, disconnecting the explicit trunk and routing the call from the user telephone to the received telephone number via said implicit trunk.

11. The method according to claim 10, wherein establishing the first connection includes establishing the first connection in response to receiving an off-hook wink start from the user telephone.

12. The method according to claim 10, further comprising performing an inverted wink communication.

13. The method according to claim 10, further comprising putting the user telephone on hold prior to disconnecting the implicit trunk and connecting the explicit trunk.

14. The method according to claim 13, further comprising putting the user telephone on hold prior to disconnecting the explicit trunk and routing the call to the dialed telephone number.

15. The method according to claim 13, further comprising receiving universal tones in receiving the dialed telephone number.

16. The method according to claim 10, further comprising handing off the call if any dialed digits are detected.

17. The method according to claim 10, further comprising communicating in response to receiving a spoken keyword prior to a dialed number.

18. The method according to claim 1, further comprising listening for a voice telephone number, and, in response to receiving a voice telephone number, communicating the voice telephone number.

* * * * *